J. Little.
Mower.
N° 24,128. Patented May. 24, 1859
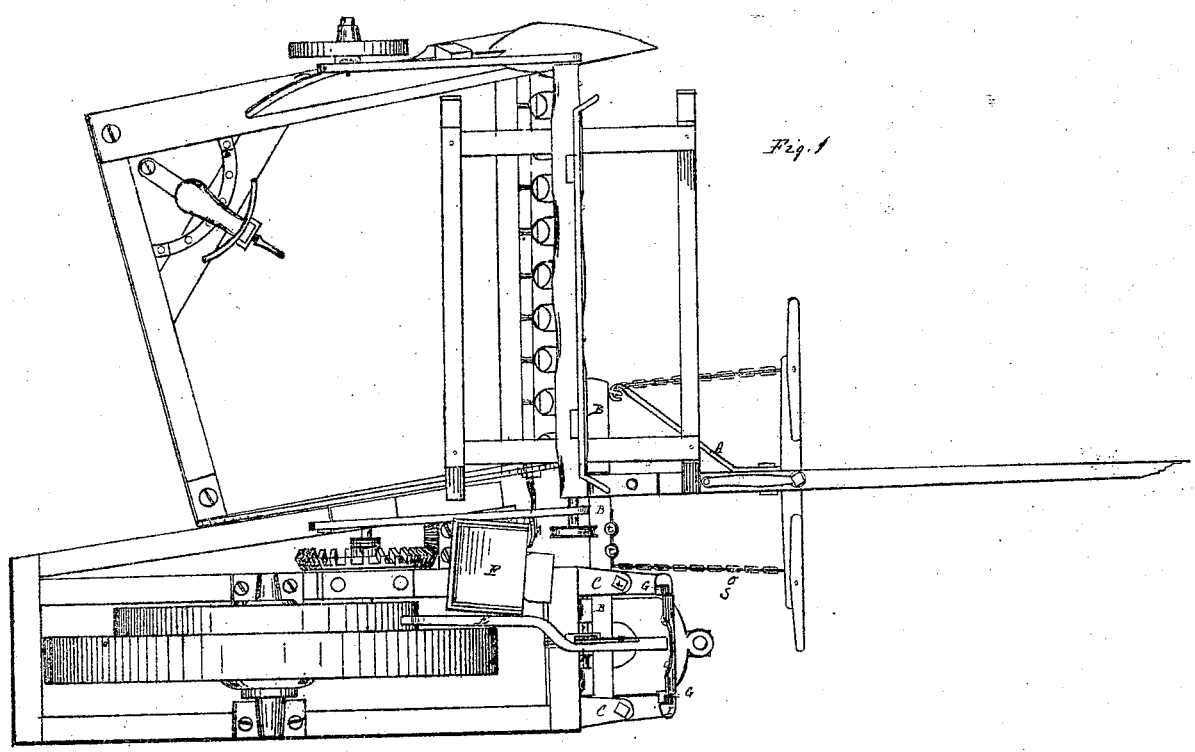
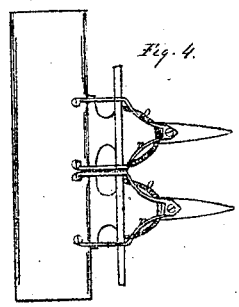
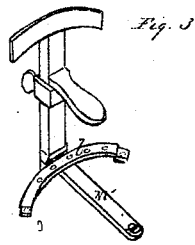
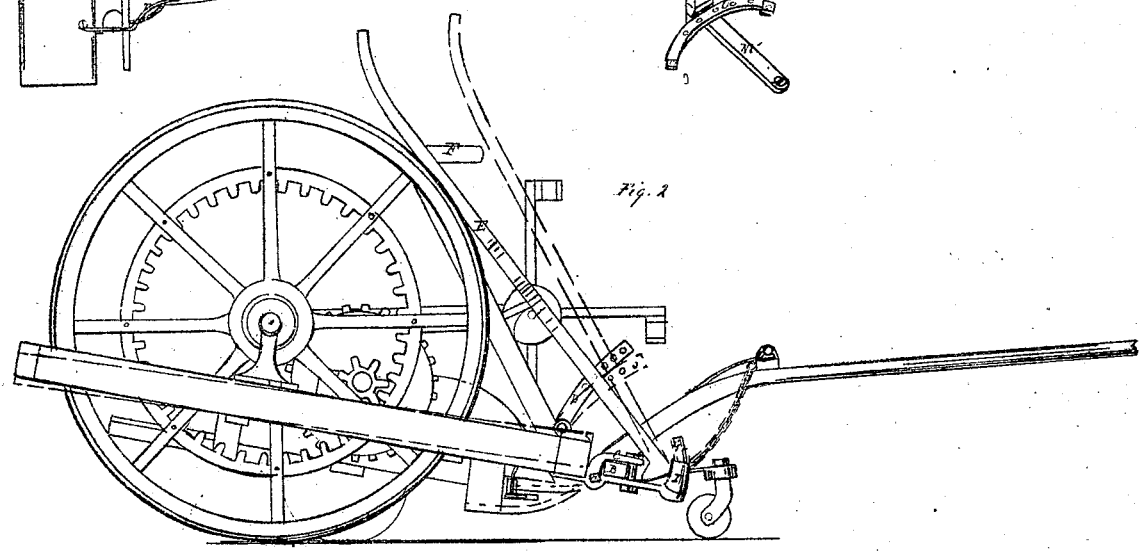

UNITED STATES PATENT OFFICE.

JESSE LITTLE, OF CHAMBERSBURG, PENNSYLVANIA.

IMPROVEMENT IN HARVESTING-MACHINES.

Specification forming part of Letters Patent No. 24,128, dated May 24, 1859.

*To all whom it may concern:*

Be it known that I, JESSE LITTLE, of Chambersburg, in the county of Franklin and State of Pennsylvania, have invented a new and useful Improvement on a Harvester or Machine for Cutting and Harvesting Grain and Grass; and I do hereby declare that the following is a full, clear, and exact description of the construction and operation of the same, reference being had to the annexed drawings, making a part of this specification, in which—

Figure 1 is a top view of the machine. Fig. 2 is a side view; Fig. 3, a shifting seat for the raker, and Fig. 4 a section representing the guards and circular cutters or blades.

B, (represented in a top view of the machine,) Fig. 1, is a bar of wood of sufficient dimensions and strength, with the required number of eyelets, passing through and firmly held in the caster plate or frame C C by a bolt, $d$. To this bar the tongue $p$ is attached by a bolt or ring, allowing it to play.

A is an adjustable brace attached to bar B, as described in the drawings, with a groove or slit adjusted to the side of the tongue $p$, and secured by and sliding upon bolt $e$, supporting the tongue in a forward or turning movement. Bar B can be so shifted by means of bolt $d$ and eyelets $t\,t$ as to adjust the motive power to the center of gravity or weight and resistance of the machine when working in light or heavy grain or grass, thereby avoiding a side draft and equalizing the labor of the horses, and by means of the stay-chains $g$ $g$, in connection with the above, no irregularity in the draft of the horses can destroy the equilibrium obtained. By means of brace A and the groove or slit sliding on bolt $e$, as described, the tongue $p$ is allowed, in turning, to break or move suddenly at an angle of thirty degrees, or more, compelling the propelling-wheel to revolve in a circuit, and thereby operating the cutters or blades as effectively in a rounding as in a forward movement, and greatly lessening the area required for turning. Short turns are effected in other machines by making the wheel turn upon its axis, the cutters remaining inactive, or dragged round without cutting the grain or grass.

C C is a caster-frame, in Fig. 1, with jaws I I, in which segments G G work, by which the caster-plate is firmly held and supported, insuring certainty, precision, and safety in all the required operations of the caster or guide wheel.

Fig. 4 represents a section of the blades and fenders. The blades O O are semicircular, and the fenders $n\,n$ are attached to the fingers and finger-bar by screws, and are so shaped and constructed as to form an unbroken connection or continuation, preventing the possibility of the grain or grass escaping the cutters or choking or clogging them.

What I claim, and desire to have patented, is—

1. The arrangement of the sliding brace A in combination with the tongue $p$ and bar B, constructed and operating in the manner described, for the purpose specified.

2. The combination and arrangement of caster-plate C C, jaws I I, and segments G G in the manner and for the purpose herein described.

JESSE LITTLE.

Witnesses:
B. H. DORSEY,
L. G. BRANDEBURY.